United States Patent [19]

Berglund

[11] Patent Number: 4,517,664
[45] Date of Patent: May 14, 1985

[54] SEISMIC APPARATUS
[75] Inventor: Carl O. Berglund, Houston, Tex.
[73] Assignee: Teledyne Exploration Company, Houston, Tex.
[21] Appl. No.: 320,417
[22] Filed: Nov. 12, 1981

Related U.S. Application Data

[63] Continuation-in-part of Ser. No. 135,476, Mar. 31, 1980, Pat. No. 4,336,639.

[51] Int. Cl.³ .............................................. H04R 17/00
[52] U.S. Cl. .................... 367/163; 367/165; 367/174
[58] Field of Search ............... 367/154, 155, 157, 159, 367/160, 161, 163, 165, 173, 174; 310/337, 331

[56]  References Cited
U.S. PATENT DOCUMENTS

| | | | |
|---|---|---|---|
| 2,976,434 | 3/1961 | Henry et al. | 367/155 |
| 3,376,948 | 4/1968 | Morrow | 181/0.5 |
| 3,518,677 | 6/1970 | Florian | 367/154 |
| 3,660,809 | 5/1972 | Pearson | 367/155 |
| 3,696,329 | 10/1972 | Hazelhurst | 367/154 |
| 3,885,286 | 5/1975 | Hill | 29/203 D |
| 3,970,878 | 7/1976 | Berglund | 367/160 |
| 4,296,481 | 10/1981 | Weiss | 367/20 |

Primary Examiner—Nelson Moskowitz
Assistant Examiner—Gregory Issing

[57]  ABSTRACT

A seismic streamer section includes a flexible tube with bulkheads at intervals therealong, end means to make electrical and mechanical connections with adjacent sections, tension lines extending from one end means to the other through the bulkheads, hydrophones in the tube between the bulkheads, an electric bundle including through conductors extending from one end means to the other through the bulkheads to various ones of the hydrophone. Each hydrophone comprises a drum shaped case with dished ends and convex sides providing standoff from the bundle and lines for piezoelectric wafers supported inside the ends. A cylindrical metal ring forms the side of the case. Stainless steel cups disposed with their bottoms adjacent and having their rims welded to the rims of the ring form the ends of the case. The piezoelectric wafers are conductively secured one each to the inner surfaces of flexible diaphragms forming the bottoms of the cups. Flat metal discs are conductively secured one each to the mid-portions of the adjacent faces of the wafers. Flexible metal wires are integrally connected one each at one end to the outer peripheries of the discs. The other ends of the wires are inserted into and soldered to a metal tube extending radially through the ring. The tube is ceramically insulated from the ring and sealed thereto fluid tight. The tube may be bonded in place to the ring. The metal discs are separated by a distance equal to the sum of the permissible maximum inward displacements of the wafers. An elastomeric bumper may surround the ring.

17 Claims, 18 Drawing Figures

SEISMIC APPARATUS

CROSS REFERENCE TO RELATED APPLICATION

This application is a continuation-in-part of application Ser. No. 135,476 filed Mar. 31, 1980, now U.S. Pat. No. 4,336,639, issued June 29, 1982.

BACKGROUND OF THE INVENTION

This invention relates to hydrophones and more particularly to such hydrophones used in seismic streamers for seismic exploration under water.

Seismic streamers are usually made up from a plurality of sections each several hundred feet long, coupled together electrically and mechanically. Each section comprises a tube of flexible plastics material, such as polyurethane, several inches in diameter and about an eighth of an inch thick, within which a number of hydrophones are disposed at intervals of a foot or two along the length of the section. In between the hydrophones are other electrical components such as transformers. Bulkheads distributed along the length of the section, e.g. between each adjacent pair of hydrophones, keep the tube round so as not to press in on the hydrophones. Steel lines extend the length of the section to take tension imposed on the section, the lines extending inside the tube through passages in the bulkheads and alongside of the hydrophones. Electrical conductors extend from each hydrophone to one end of the section, and additional electrical conductors extend from the one end of the section to the other. The electrical conductors extend through passages in the bulkheads and alongside of the hydrophones. The streamer section is filled with oil to provide a desired overall specific gravity near to 1.0, and to keep salt water out of the tube and away from the electrical conductors and electrical components, and to transmit to the hydrophones pressure waves of acoustic and near acoustic frequency (hereinafter referred to simply as acoustic waves or frequency). The pressure waves in the water in which the tube is immersed pass through the flexible tube and through the oil in the tube to the hydrophones. When the section is not in use it is wound on a reel that is several yards in diameter.

It will be apparent that a hydrophone employed in a streamer section must have enough strength and toughness to withstand a certain amount of abuse during reeling and unreeling. In addition, the hydrophone must have enough rigidity to minimize mechanical strains, keeping them small in comparison to acoustic deformations of the pressure sensitive diaphragms of the hydrophone. Furthermore, the diaphragms must be shielded from the tension lines and electrical conductors which pass alongside of the hydrophones, since these linear elements may exert considerable lateral force when pulled taught during use. It is also desirable to protect the electrical parts of the hydrophone, i.e. the piezoelectric elements mounted on the diaphragms, from mechanical destruction due to contact with the tension lines and electrical conductors. Finally, the hydrophone's gas (air) chamber, must be sealed liquid tight to prevent entrance of oil or other liquid into the chamber, for such liquid would fill up the chamber and render the hydrophone insensitive to acoustic waves. On the other hand, means must be provided to limit the inward travel of the diaphragms under excessive pressure, e.g. due to the streamer being subjected to excessive hydrostatic pressure.

In response to the foregoing requirements it has heretofore been disclosed that a hydrophone may be constructed as described in U.S. Pat. No. 3,970,878—Berglund the disclosure of which is incorporated herein by reference. According to that patent a hydrophone comprises a pill box shaped chamber housing peizoelectric wafers on the inside of the top and bottom of the case. In one embodiment the case includes a glass ring to which are bonded diaphragms made of beryllium-copper, phosphorbronze, stainless steel or glass. According to a commercially adopted embodiment of the construction shown in the Berglund patent, the pill box shaped chamber is formed by two brass cups placed rim to rim and soldered together. Piezoelectric wafers are conductively secured to the insides of the flexible diaphragms forming the bottoms of the cups. Flanges extending radially from the rims of the cups are received within elastomeric channels provided inside a protective housing. Within the chamber formed by the cups is a plastics material spacer which limits inward displacement of the diaphragms and the wafers secured thereto. The brass cups themselves serve as one pole of the hydrophone, being connected internally to the outer side of each wafer. The inner sides of the wafers are tied together and a conductor connected thereto is brought out through a glass bushing in a hole in one of the cups. The chamber formed by the cup is thus composed entirely of corrosion resistant metal and ceramic material so that it is impervious to destruction by oil or any salt water which may leak into the tube of the streamer section or by any corrosive gas associated therewith, whereby the chamber remains fluid tight.

Although the foregoing construction has been highly successful commercially, the thought has occurred that its construction would be improved if the plastics material spacer could be eliminated. The persent invention accomplishes that result and in addition eliminates the outer protective housing and considerably reduces the size and cost of the hydrophone. At the same time all of the advantages of the prior construction are retained.

SUMMARY OF THE INVENTION

According to the invention, a hydrophone for a seismic streamer section includes two conductively coated piezoelectric wafers, each conductively secured at one face to the inner side of one of two flexible metal diaphragms. The diaphragms are supported at their peripheries by axially outwardly extending flanges formed integral therewith having lips which are welded to the upper and lower rims of a cylindrical or preferably externally double convex metal ring to form a fluid (liquid and gas) tight case. The flanges position the wafers in close proximity to limit their inward flexure under excessive external pressure.

The ring has sufficient axial extent:

(a) to create sufficient external standoff distance to keep the diaphragms out of contact with adjacent electrical conductors and tension lines in the streamer section, (b) to provide sufficient rigidity to the ring to reduce diaphragm displacement due to ring strain, e.g. due to lateral pressure from adjacent electric conductors and tension lines in the streamer section, to an insignificant amount compared to expected diaphragm displacement due to changes in hydrostatic pressure thereon, (c) to support a metal pin grounded to the ring to provide one external electrical connection post for the hydrophone, and (d) to pass and support an exteriorly ceramically insulated metal tube providing another external electrical connection post for the hydrophone.

The integral diaphragms and flanges form metal cups. Preferably the cups and the metal ring are made of stainless steel or other corrosion resistant metal having sufficient electrical resistivity to facilitate electric welding. Otherwise the cups and ring could be soldered together.

Flat electrically conductive metal discs conductively secured one each to mid-portions of the adjacent faces of the piezoelectrical wafers have integral flexible electrically conductive metal wires extending one each from their peripheries. The outer ends of the wires are soldered into a ceramic insulated electrically conductive metal tube extending through the side of the case. The portion of the metal tube extending outside the case provides one electric terminal of the hydrophone. A solid electrically conductive metal pin secured to the exterior of the ring provides the other electric terminal of the hydrophone, the stainless steel case having enough electrical conductivity to electrically connect the crystals to the solid metal pin.

BRIEF DESCRIPTION OF THE DRAWINGS

For a detailed description of a preferred embodiment of the invention reference will now be made to the accompanying drawings wherein.

The drawings are to scale and the conventions of the United States Patent and Trademark Office for patent cases have been employed to indicate materials.

DESCRIPTION OF PREFERRED EMBODIMENT

Case

Figure 1:
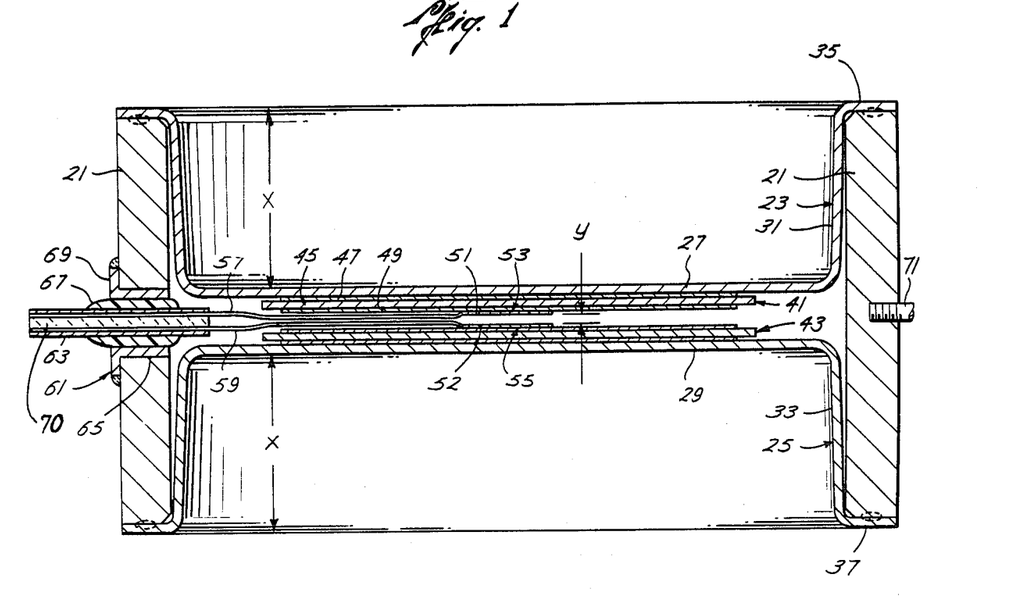
FIG. 1 is a sectional view of a hydrophone embodying the invention.

Referring now primarily to FIG. 1 and also to FIGS. 2-13 as the context indicates, there is shown a hydrophone including a stainless steel ring 21 forming the side wall of a drum shaped case. As shown in FIGS. 1, 6, 12 and 13, ring 21 may have cylindrical inner and outer peripheries. However for increased strength and rigidty for any given weight it is preferred that the outer periphery be double convex, i.e. of larger diameter around the middle of the ring and of smaller diameter at the ends of the ring; such a modified ring is shown at 21A in FIG. 14, the double convex or barrel shaped exterior surface being indicated at 22.

Two stainless steel cups 23, 25, which should be identical, form the ends of the drum shaped case. Each cup includes a flat circular flexible diaphragm 27, 29, an axially extending flaring flange 31, 33, and a flat lip 35, 37. Lips 35, 37 are electrically welded to ring 21 around the entire perimeter of the ring to form a liquid tight and preferably gas tight seal, i.e. a hermetic or fluid tight seal. As previously explained, a liquid tight seal is required to prevent liquid from seeping into the case, for if the case were filled with liquid the diaphragms would be unable to flex under changes of external pressure. It is also desirable that the seal be gas tight to keep corrosive sea atmosphere or gases from displacing the relatively harmless land air with which the case is filled when the hydrophone is manufactured.

Although stainless steel is a preferred material for the cups and ring, providing enough electrical resitivity to enable the parts to be welded together electrically, other materials may be used for the cups and ring. If the cups are to be soldered to the ring, beryllium-copper or other brass is a good material.

Case Dimensions

The diaphragms must be thin enough to flex under the changing water pressure produced by acoustic waves. In the case of brass, a thickness of 0.012 inch is satisfactory, and this should be appropriate for stainless steel diaphragms as well. The cups may be cold stamped from sheet metal, which may result in the diaphragm and lip having the same thickness and the axial flange or side of each cup being somewhat thinner. A fillet of 1/32 inch radius is provided at the juncture of the flange and diaphragm. With a cup having an exterior height of 0.210 inch, the radial flare of the side of each cup may be 0.011 inch from a diaphragm external diameter of 0.740 inch. The lip may have a width of 0.120 inch corresponding to the thickness of the ring. The outer diameter of the ring may be 0.870 inch.

Piezoelectric Wafers

Figure 2:
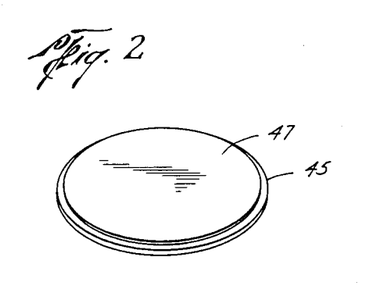
FIGS. 2 and 3 are respectively a perspective and elevation of a piezo-electric wafer used in the hydrophone shown in FIG. 1.
Figure 3:
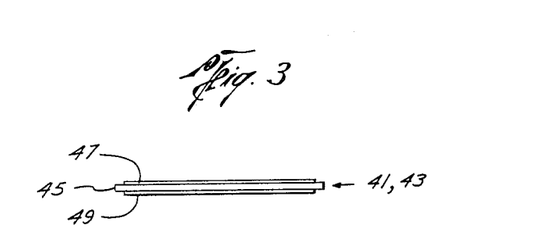
Figure 4:
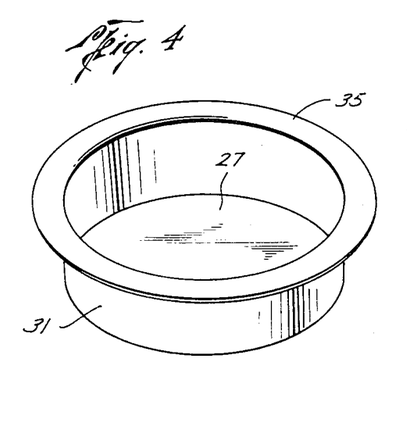
FIGS. 4 and 5 are respectively a perspective and sectional view of a cup forming the upper end of the hydrophone case.
Figure 5:
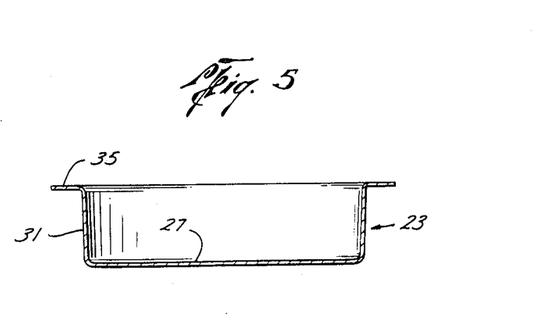
Figure 6:
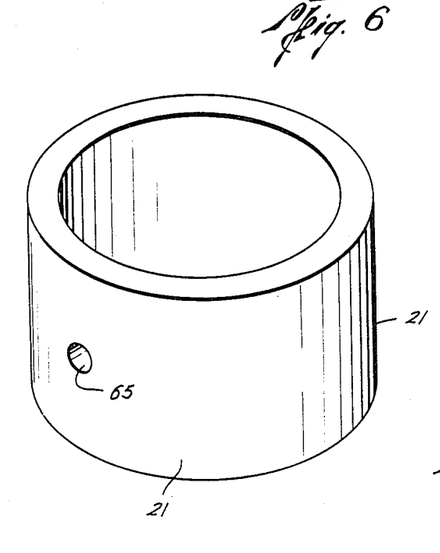
FIGS. 6 and 7 are respectively a perspective view of a ring forming the side of the hydrophone case and a sectional view of a cup forming the lower end of the hydrophone case.
Figure 7:
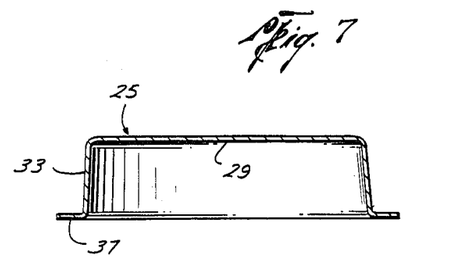

Conductively secured to the inner face of each diaphragm is one of two piezoelectric crystal wafers 41, 43, which should be identical. Each wafer includes a circular disc shaped element 45 of piezoelectric material, e.g., a symmetric or asymmetric lattice piezoelectric crystal or polarized ceramic. Circular disc shaped central areas 47, 49, on the opposite faces of each wafer are covered with an electrically conductive metal, e.g. a deposit of silver. Specifications for a typical wafer are as follows:

| Wafer Material . | Polarized Ceramic | (G-1512 Gulton Industries, Inc., Fullerton, California) |
|---|---|---|
| Wafer Thickness | 0.010 inch | |
| Wafer Outer Diameter | 0.550 inch | |
| Uncoated perimeter | 0.020 inch | |
| Capacitance | 0.018 MFD | (0.009 MFD for two in parallel) |
| Coupling Measurement Fa/Fr | 1.1600 min. | |
| Wafer Thickness at Uncoated Edge | 0.020 inch | |
| Diameter of Metal Coated Area | 0.510 inch | |

Electrical Connections To Wafers

Figure 8:
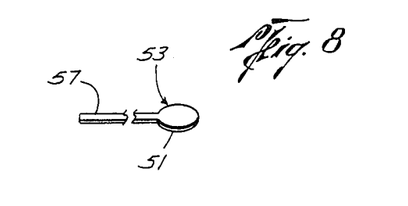
FIGS. 8 and 9 are respectively a perspective and side view of an interior electrical connector employed in the hydrophone.
Figure 9:
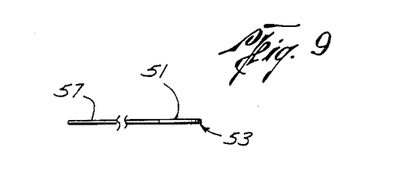
Figure 9A:
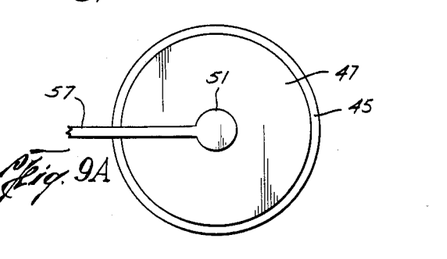
FIG. 9A is a plan view of one of the piezoelectric wafers and assocated electrical connector.

Each wafer has one of its metal coated surfaces bonded to the inner face of one of diaphragms 27, 29 by conductive cement, e.g. a conductive epoxy. If the wafers are made of a crystal having an asymetric lattice or, as is preferred, the wafers are made of polarized ceramic material, the wafers should be disposed with like poles bonded to the diaphragms, the other poles (which are also like unto each other) being adjacent. To the outer metal coated surface of each wafer is conductively bonded the circular conductive metal disc portion 51 of one of two interior electrical connectors 53, 55. Such conductive bonding may be effected with a conductive epoxy cement. Each disc 51 has integrally formed therewith a metal wire electric conductor of the same thickness as the disc, as shown at 57, 59.

A feed through electrical terminal or connector 61 extends through ring 21. A feed through electrical terminal provides means for electrically connecting devices that are on opposite sides of a wall that must be liquid or fluid tight. It comprises an elongated conductor and an electrically insulating bushing therearound. It may further include a tube around the bushing, and means for securing the tube to the wall. See, for example, the Catalog of Hermetic Seal Corp., "Single Seal Terminals" HSC Series 1000 and 1200, and electrodes, pages 1, 4, and 30, eg TT40, T, K 1236*, and K 1236-F.

As shown in FIG. 1, terminal 61 includes an electrically conductive metal tube 63 with a preferably electrically conductive metal sleeve 65 thereabout secured thereto and insulated therefrom by a glass (or other ceramic) bushing 67. Sleeve 65 has a radial flange 69 of preferably electrically conductive metal formed integral therewith. The periphery of flange 69 is preferably electrically welded, or else in other manner welded or soldered to ring 21 to form a liquid tight, preferably air tight, i.e., hermetic, seal.

Figure 14:
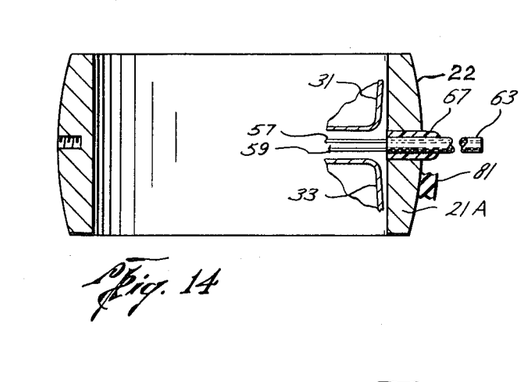
FIG. 14 is a section through a modified form of ring which may be employed for the side of the hydrophone case and a modified form of mounting of the feed through terminal in the ring.
Figures 15, 16:
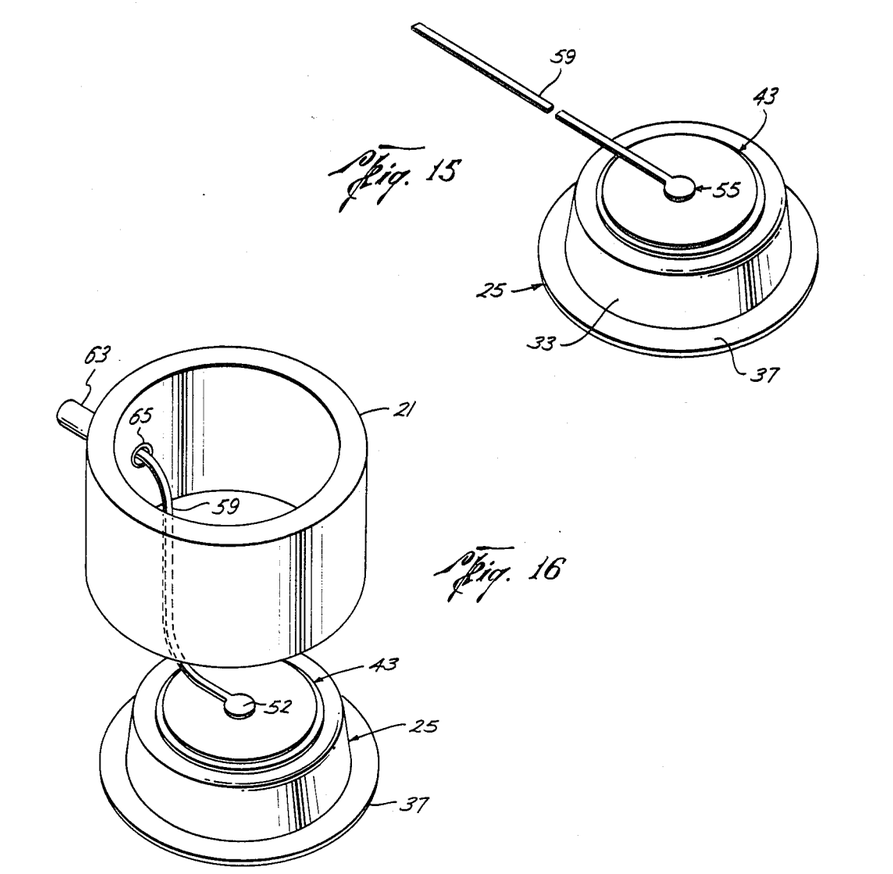
FIG. 15 is a plan view of a piezoelectric wafer secured between a case diaphragm and a conductor leaf in accordance with one stage of the method of the invention.
FIG. 16 is a pictorial view showing the subassembly of FIG. 15 being assembled with a ring of the hydrophone case in a later stage in the method of the invention.
Figure 17:
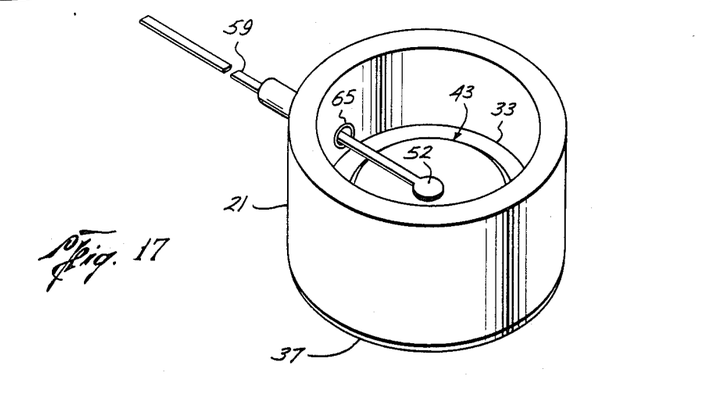
FIG. 17 is a plan view showing a still later stage in said method in which the diaphragm support flange has been welded to the case ring.

Preferably, however, as shown in FIG. 14, sleeve 65 is omitted and bushing 67 is bonded directly to ring 21. The construction of connectors 53, 55, comprising discs 51 with integral tabs or wires 57, 59, makes it possible to assemble the wires 57, 59 into the tube 63 when it is already mounted in ring 21. The inner end of tube 63 may be flush with the inner periphery of ring to further facilitate such mode of assembly, as shown in FIG. 14.

In both the FIGS. 1 and 14 constructions, after Conductors 57, 59 are received in the inner end of tube 63 and the tube is filled with solder 70 to connect the conductors electrically to the tube and to close the tube, sealing it liquid tight and preferably air tight, i.e. hermetically.

In the foregoing manner solder filled tube 63 becomes one electric pole of a hydrophone electric circuit comprising the two wafers 53, 55 connected in parallel. The case itself forms the other pole of the hydrophone circuit, each wafer having one face electrically conductively connected to one of the diaphragms forming the ends of the drum shaped case of the hydrophone. A solid electrically conductive flanged metal pin 71 (FIG. 12) is screwed into the ring 21 up to its flange to provide a binding post for making external connection to the case.

Bumper

Figure 10:
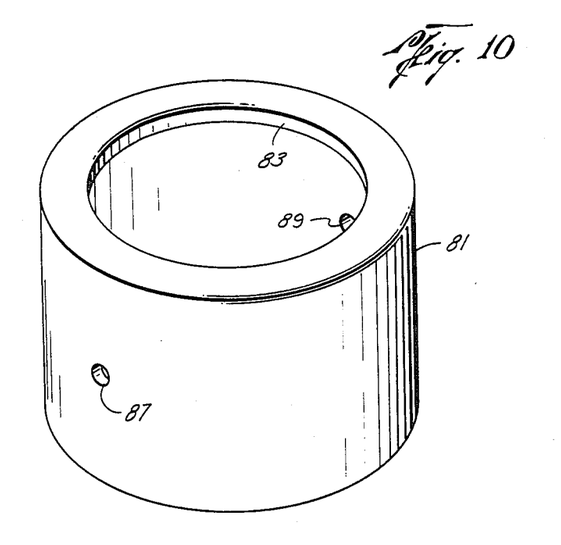
FIG. 10 is a perspective view of a bumper employed in the hydrophone.
Figure 11:
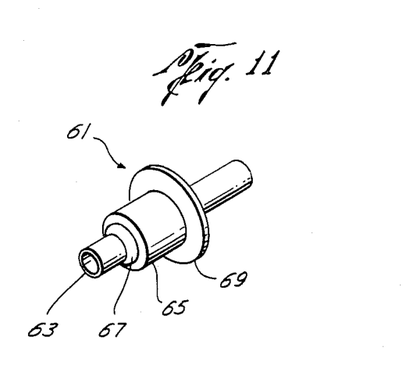
FIG. 11 is a perspective view of a bulkhead connector employed in the hydrophone.
Figure 12:
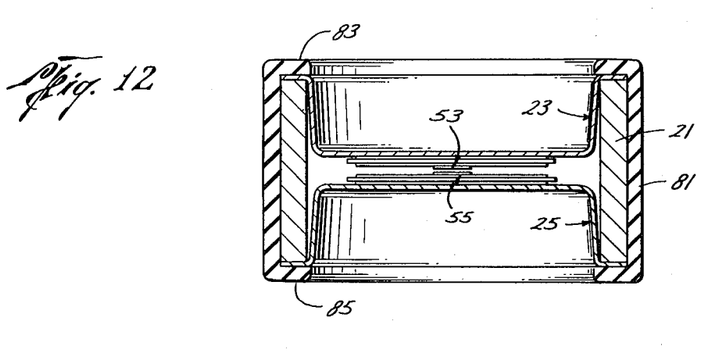
FIG. 12 is a section similar to FIG. 1 showing the hydrophone with bumper in place therearound, the section plane being displaced azimuthally a few degrees to show the case-grounded connector terminal.

Around the exterior of ring 21 and overlapping its ends may be placed an elastomer bumper ring 81. Ring 81 has upper and lower inturned flanges or lips 83, 85 which overly lips 35, 37 of cups 23, 25. A pair of holes 87, 89 (FIG. 10) provide for passage of tube 63 and rod 71 through the bumper. The bumper is preferably made of an oil and water resistant material such as polyurethane or polyvinyl chloride having a durometer hardness of between 40 and 80 on the Shore A scale. If desired, bumper ring 81 may be omitted, its purpose being merely to insulate the hydrophone wafers from noise created, e.g. by rubbing of electric conductors thereagainst. In this connection it may be noted that by making the ring of the case externally double convex as shown in FIG. 14, contact of the base case with linear elements such as cables and wires is reduced to nearly point contact.

Streamer Section

Figure 13:
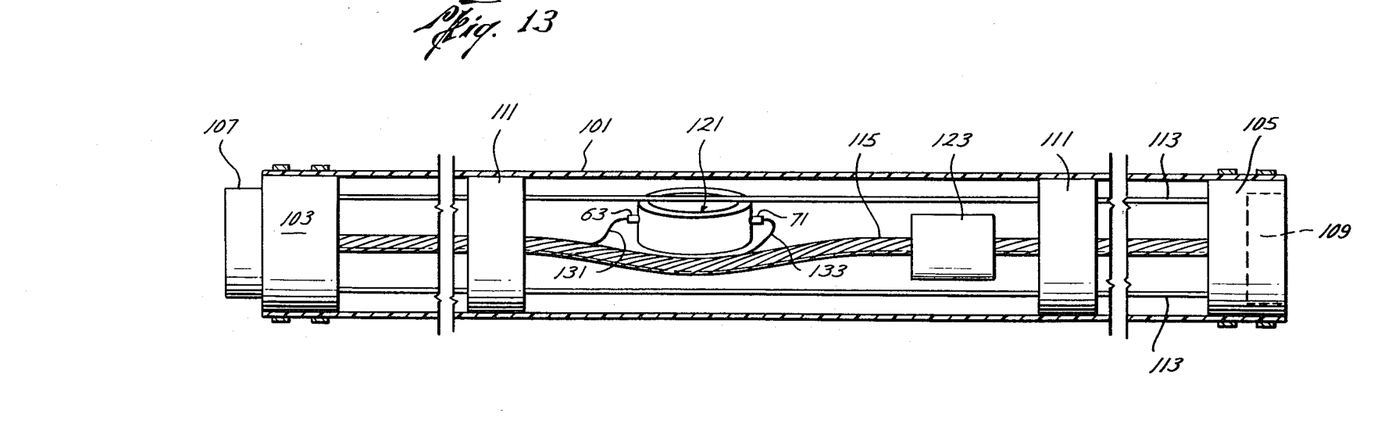
FIG. 13 is an axial section through a seismic cable section employing a hydrophone in accordance with the invention.

Referring now to FIG. 13 there is shown a seismic streamer cable section employing the invention. The section includes a flexible polyurethane tube 101 filled with oil and closed at its ends 103, 105. Suitable electrical and mechanical connectors, shown schematically at 107, 109, are provided at the ends of the streamer section for making connection with other streamer sections. The tube is several inches in diameter and about a hundred yards long. At intervals of about a foot or two along the length of the streamer are bulkheads 111. Three mechanical tension taking lines 113 (only two shown), disposed 120 degrees apart about the streamer axis, extend through holes in the bulkheads and through the length of the tube and to the connectors 107, 109 at the ends of the section. A bundle of electric conductors 115 includes wires extending the length of the section between connectors 107 and 109 and further wires extending from one of the connectors to each of a plurality of hydrophones 121 disposed along the length of the section, one hydrophone, usually, between each bulkhead. Other electrical components such as a transformer 123 may also be connected to wire bundle 115.

It will be seen that due to the standoff distance X (FIG. 1) between each hydrophone diaphragm and the ends of ring 21, the diaphragm is protected against contact with wire bundle 115, even when the latter is pulled taut. Also, the diaphragms are protected by such standoff distance from contact with mechanical tension lines 113 and the inside of tube 101. Further standoff is provided by bumper 81 if same is employed. In addition, bumper 81 would reduce transmission of mechanical noise due to ring 21 rubbing against were bundle 115, lines 113, or tube 101, or transformers 123.

FIG. 13 also illustrates the manner of connection of hydrophone 121 to wire bundle 115, two wires 131, 133 from the bundle being soldered to terminals 63, 71.

Diaphragm Motion p It will be apparent that the hydrophone is unresponsive to acceleration, i.e. seismic tremors, since the piezoelectric wafers are connected with their adjacent faces in parallel. Acceleration would bow both diaphragms and their associated wafers in the same direction producing neutralizing potentials. On the other hand, acoustic waves in the water will cause both diaphragms to move in or out, bowing the wafers in opposite directions, causing like charges to appear on the inner faces of both wafers and a charge opposite thereto to appear on the outer faces of both wafers.

Should the cable section be subjected to excessive hydrostatic pressure, diaphragms 27 and 29 will move toward each other until metal discs 51, 52 contact each other, stopping further inward motion and protecting the crystals against excessive deformation. The initial or unstressed spacing y between the adjacent faces of discs 51, 52 when the discs are not displaced at all is equal to twice the permissible displacement of the center of each wafer relative to its periphery as is clear from the scale drawing, FIG. 1, y is less than twice the thickness of a wafer.

It will be noted that conductors 57, 59 have enough flexibility and length to allow free movement of the diaphragms without interference from the conductors.

Method

It will be appreciated from the foregoing description that a part of the invention lies in the method of assembly of the hydrophone. The method is described and claimed in U.S. Pat. No. 4,336,369, the disclosure of which is incorporated herein by reference.

While a preferred embodiment of the invention has been shown and described, variations thereof can be made by one skilled in the art without departing from the spirit of the invention.

It has been found that if ordinary stainless steel is used for the cups, each of which includes a diaphragm, flange and lip, there results a change of about 0.2 decibels in sensitivity after the hydrophone has been put into use and subjected to hydrostatic pressure; this is due to the mechanical hysteresis of the metal, causing it to take a permanent set. Although this is not a fatal defect, in order to eliminate the problem it is preferred to employ for the metal of the cups a nickel steel alloy known under the tradename "ELINVAR EXTRA" for which technical data has been published by Hamilton Technology, Inc. entitled MET-Data" with the subtitle "Product Designation: ELINVAR EXTRA ®" said publication being incorporated herein by reference.

I claim:

1. A seismic streamer section including
   a flexible tube adapted to contain liquid,
   end means at each end of the tube for making mechanical and electrical connection with an adjacent tube and for closing the ends of the tube,
   bulkheads in the tube disposed at intervals along the length of the tube,
   mechanical tension lines extending from one end means at one end of the tube through the tube and said bulkheads to the other end means at the other end of the tube,
   hydrophones in the tube disposed at intervals along the length of the tube between the bulkheads, and
   an electric conductor bundle in the tube including through conductors extending from said one end means to said other end means and other conductors extending from said one end means to various ones of said components,
   each hydrophone comprising a drum shaped case and two wafer shaped piezoelectric transducer means disposed within the case, the case including a ring forming the sides of the case, said ring having two open ends, diaphragms closing the ends of the ring and forming the ends of the case and each separately supporting one of said piezoelectric transducer means, support means supporting one diaphragm directly from one end of the ring and the other diaphragm directly from the other end of the ring with the plane of each diaphragm being displaced inwardly from the plane of the end of the ring from which the diaphragm is supported to provide standoff between the diaphragm and said bundle and lines.

2. A hydrophone adapted for use in a seismic streamer section of the kind including
   a flexible tube adapted to contain liquid,
   end means at each end of the tube for making mechanical and electrical connection with an adjacent tube and for closing the ends of the tube,
   bulkheads in the tube disposed at intervals along the length of the tube,
   mechanical tension lines extending from one end means at one end of the tube through the tube and said bulkheads to the other end means at the other end of the tube,
   hydrophones in the tube disposed at intervals along the length of the tube between the bulkheads, and
   an electric conductor bundle in the tube including through conductors extending from said one end means to said other end means and other conductors extending from said one end means to various ones of said components,
   said hydrophone comprising a drum shaped case and two wafer shaped piezoelectric transducer means disposed within the case, the case including a ring forming the sides of the case, said ring having two open ends, diaphragms closing the ends of the ring and forming the ends of the case and each separately supporting one of said piezoelectric transducer means, support means supporting one diaphragm directly from one end of the ring and the other diaphragm from the other end of the ring with the plane of each diaphragm being displaced inwardly from the plane of the end of the ring from which the diaphragm is supported to provide standoff between the diaphragm and the bundle and lines of a streamer section of the aforesaid kind in which the hydrophone may be used.

3. Apparatus according to claim 1 or 2,
   one of said piezoelectric transducer means being secured to the inner face of said one diaphragm and the other of said piezoelectric transducer means being secured to the inner face of said other diaphragm, the adjacent faces of said piezoelectric transducer means being separated but in close proximity to limit their inward flexure under hydrostatic pressure external to said case.

4. A seismic streamer section including
   a flexible tube adapted to contain liquid, end means at each end of the tube for making mechanical and electrical connection with an adjacent tube and for closing the ends of the tube,
bulkheads in the tube disposed at intervals along the length of the tube,
mechanical tension lines extending from one end means at one end of the tube through the tube and said bulkheads to the other end means at the other end of the tube,
hydrophones in the tube disposed at intervals along the length of the tube between the bulkheads,
an electric conductor bundle in the tube including through conductors extending from said one end means to said other end means and other conductors extending from said one end means to various ones of said components,
the space inside said tube around said bundle and said hydrophones and said lines and said bulkheads being filled with liquid,
each hydrophone comprising a liquid tight case and piezoelectric means disposed within the case, said case including a ring having two ends and two dished diaphragm means, each diaphragm means including a diaphragm disposed inwardly of said ends and a flange extending around the perimeter of the diaphram and flaring from the diaphragm toward the adjacent end of the ring, each flange having an annular lip secured to the periphery of the flange that is remote from the diaphram, said flange being integral with said diaphragm and lip, said diaphragms being parallel and flexible
said ring itself having open ends and each of said two dished diaphragm means closing a different one of said two ends of said ring and to that end each of said dished diaphragm means being disposed with its lip overlying the respective end of the ring and sealed thereto, the exterior of both diaphragms being exposed to the ambient exterior to said case,
said piezoelectric means comprising first piezoelectric transducer means secured to the inner face of only one of said diaphragms and second piezoelectric transducer means secured to the inner face of only the other of said diaphragms, the adjacent faces of said piezoelectric transducer means being separated,
said flanges providing support means for said diaphragms creating a standoff between each diaphragm and said bundle and lines,
said support means positioning said transducer means to engage each other upon flexure of said diaphragms and thereby limit
the maximum displacement of each said transducer means under hydrostatic pressure external to said case.

5. A hydrophone for use in a seismic streamer section of the kind including
a flexible tube adapted to contain liquid,
end means at each end of the tube for making mechanical and electrical connection with an adjacent tube, and for closing the ends of the tube,
bulkheads in the tube disposed at intervals along the length of the tube,
mechanical tension lines extending from one end means at one end of the tube through the tube and said bulkheads to the other end means at the other end of the tube,
hydrophones in the tube disposed at intervals along the length of the tube,
an electric conductor bundle in the tube including through conductors extending from said one end means to said other end means and other conductors extending said one end means to various ones of said components,
the space inside said tube around said bundle and said hydrophones and said lines and said bulkheads being filled with liquid,
said hydrophone comprising a liquid tight case and piezoelectric means disposed within the case, said case including a ring having two ends and two dished diaphragm means, each diaphragm means including a diaphragm disposed inwardly of said ends and a flange extending around the perimeter of the diaphragm and flaring from the diaphragm toward the adjacent end of the ring, each flange having an annular lip secured to the periphery of the flange that is remote from the diaphragm, said flange being integral with said diaphragm and lip, said diaphragms being parallel and flexible,
said ring thereof having open ends and each of said two dished diaphram means closing a different one of said two ends of said ring and to that end each of said dished diaphragm means being disposed with its lip overlying the respective end of the ring and sealed thereto, the exterior of both diaphragms being exposed to the ambient exterior to said case,
said piezoelectric means comprising first piezoelectric transducer means secured to the inner face of one of said diaphragms and second piezoelectric transducer means secured to the inner face of the other of said diaphragms, the adjacent faces of said piezoelectric transducer means being separated,
said flanges providing support means for said diaphragms creating a standoff between each diaphragm and said bundles and lines when said hydrophone is disposed in a streamer section as aforesaid,
said support means positioning said transducer means to engage each other upon flexure of said diaphragms and thereby limit the maximum displacement of each said transducer means under hydrostatic pressure external to said case.

6. Apparatus according to claim 5,
including electric terminal means extending from the exterior to the interior of the case, and electric connector means connecting said piezoelectric means with said electric terminal means,
each said transducer means comprising a piezoelectric wafer having one side secured to the respective diaphragm, said electric connector means comprising a leaf of electroconductive material secured to the other side of each wafer and a wire extending from the leaf connected to said electric terminal means.

7. Apparatus according to claim 6,
said electric terminal means including an electroconductive tube, said wires extending from the leaf being flat and integral with the leaf and extending into the tube.

8. Apparatus according to claim 7,
said diaphragms, wafers and leaf being circular and concentric.

9. Apparatus according to claim 8,
said electric terminal means including a feed through electrical terminal in said ring, said feed through terminal including said tube and a ceramic bushing therearound, said tube providing an electrical terminal external to the case on the outer periphery of the ring.

10. Apparatus according to claim 9,
said ring, support means and diaphragms being electroconductive, said lips being secured to said ring in electroconductive relationship, said one side of each wafer being electro-conductively secured to the inside of the respective diaphragm, said ring having a metal post on its outer periphery providing a second electrical terminal external to the case.

11. Apparatus according to claim 10, said diaphragms each being made of the nickel steel alloy "Elinvar Extra".

12. Apparatus according to claim 10, including an annular elastomeric bumper around said ring,
said bumper having at each end an inturned annular flange extending over the adjacent one of said lips,
said bumper having two separate aperture means in its side, each aperture means passing one of said electrical terminals.

13. A hydrophone for use in a seismic streamer section of the kind including:
a flexible tube adapted to contain liquid,
end means at each end of the tube for making mechanical and electrical connection with an adjacent tube, and for closing the ends of the tube,
bulkheads in the tube disposed at intervals along the length of the tube,
mechanical tension lines extending from one end means at one end of the tube through the tube and said bulkheads to the other end means at the other end of the tube,
hydrophones in the tube disposed at intervals along the length of the tube between the bulkheads, and
an electric conductor bundle in the tube including through conductors extending from said one end means to said other end means and other conductors extending from said one end means to various ones of said components,
the space inside said tube around said bundle and said hydrophones and said lines and said bulkheads being filled with liquid,
said hydrophone comprising a case and piezoelectric means disposed within the case, said case including flexible diaphragms,
said piezoelectric means comprising first piezoelectric transducer means secured to the inner face of one of said diaphragms and second piezoelectric transducer means secured to the inner face of said other diaphragm,
said hydrophone including electric terminal means extending from the exterior to the interior of the case, and electric connector means connecting said piezoelectric means with said electric terminal means,
each said transducer means comprising a piezoelectric wafer having one side secured to the respective diaphragm, said electric connector means comprising a leaf of electroconductive material secured to the other side of each wafer and a wire extending from the leaf connected to said electric terminal means.

14. Apparatus according to claim 13
said electric terminal means including a tube of electroconductive material, said wires extending from the leaf being flat and one-piece integral with the leaf and extending into the tube.

15. Apparatus according to claim 13 or 14,
said diaphragms, wafers and leaf being circular and concentric.

16. A seismic streamer section including
a flexible tube adapted to contain liquid,
end means at each end of the tube for making mechanical and electrical connection with an adjacent tube and for closing the ends of the tube,
bulkheads in the tube disposed at intervals along the length of the tube,
mechanical tension lines extending from one end means at one end of the tube through the tube and said bulkheads to the other end means at the other end of the tube,
hydrophones in the tube disposed at intervals along the length of the tube between the bulkheads, and
an electric conductor bundle in the tube including through conductors extending from said one end means to said other end means and other conductors extending from said one end means to various ones of said components,
each hydrophone comprising a liquid tight case and piezoelectric means disposed within the case, the case including parallel flexible diaphragms
said piezoelectric means comprising first wafer shaped piezoelectric electric transducer means secured to the inner face of only one of said diaphragms and second wafer shaped piezoelectric transducer means secured to the inner face of only the other of said diaphragms, the adjacent faces of said piezoelectric transducer means being separated by less than twice the thickness of each transducer means.

17. A hydrophone comprising a liquid tight case filled with an aeroform fluid, said case including parallel flexible diaphragms, first wafer shaped piezoelectric transducer means secured to the inner face of one of said diaphragms and second wafer shaped piezoelectric transducer means secured to the inner face of the other of said diaphragms, the adjacent faces of said piezoelectric transducer means being separated by less than twice the thickness of each transducer means.

* * * * *

UNITED STATES PATENT AND TRADEMARK OFFICE
CERTIFICATE OF CORRECTION

PATENT NO. : 4,517,664
DATED : MAY 14, 1985
INVENTOR(S) : CARL O. BERGLUND

It is certified that error appears in the above—identified patent and that said Letters Patent is hereby corrected as shown below:

Column 1, line 58: change "taught" to -- taut --.

Column 2, line 39: change "persent" to -- present --.

Column 3, line 36: change "piezo-electric" to -- piezoelectric --

Column 3, line 49: change "assocated" to -- associated --.

Column 6, line 67: change "were" to -- wire --.

Column 7, line 4: delete "p".

Signed and Sealed this

Fifteenth Day of October 1985

[SEAL]

Attest:

DONALD J. QUIGG

Attesting Officer

Commissioner of Patents and Trademarks—Designate